(12) United States Patent
Bae et al.

(10) Patent No.: US 7,948,572 B2
(45) Date of Patent: May 24, 2011

(54) HOLLOW MOLD FOR RECEIVING LIQUID CRYSTAL PANEL AND DIFFUSER PLATE AND LIQUID CRYSTAL DISPLAY INCLUDING HOLLOW MOLD

(75) Inventors: Hyun-chul Bae, Suwon-si (KR); Jung-tae Kang, Suwon-si (KR); Jin-hee Park, Cheonan-si (KR); Jin-ho Ha, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 237 days.

(21) Appl. No.: 11/780,725

(22) Filed: Jul. 20, 2007

(65) Prior Publication Data

US 2008/0018826 A1    Jan. 24, 2008

(30) Foreign Application Priority Data

Jul. 21, 2006  (KR) .................. 10-2006-0068662
Sep. 14, 2006  (KR) .................. 10-2006-0089130

(51) Int. Cl.
*G02F 1/1333*    (2006.01)

(52) U.S. Cl. .......................................... 349/58
(58) Field of Classification Search ................ 349/58
See application file for complete search history.

(56) References Cited

U.S. PATENT DOCUMENTS

2004/0125269 A1 * 7/2004 Kim et al. ............... 349/58
2005/0219439 A1 * 10/2005 Kitada et al. ............ 349/58

* cited by examiner

*Primary Examiner* — Uyen-Chau N Le
*Assistant Examiner* — Kajli Prince
(74) *Attorney, Agent, or Firm* — Innovation Counsel LLP

(57) ABSTRACT

Provided are a hollow mold for receiving a liquid crystal panel and a diffuser plate, the hollow mold capable of automating an assembling process of a liquid crystal display (LCD) and fixing a reflective sheet, and an LCD including the hollow mold. The hollow mold includes an outer side surface; a top surface; an inner side surface comprising a first step which is formed in a stepped shape, defines an upper receiving space and performs a supporting function, a second step which defines a lower receiving space and performs the supporting function, and an inclined surface which slopes downward from the second step; and a bottom surface.

18 Claims, 15 Drawing Sheets

HOLLOW MOLD FOR RECEIVING LIQUID CRYSTAL PANEL AND DIFFUSER PLATE AND LIQUID CRYSTAL DISPLAY INCLUDING HOLLOW MOLD

CROSS-REFERENCE TO RELATED APPLICATIONS

This application claims priority from Korean Patent Application No. 10-2006-0068662 filed on Jul. 21, 2006 and No. 10-2006-0089130 filed on Sep. 14, 2006 in the Korean Intellectual Property Office, the disclosures of which are incorporated herein by reference in their entirety.

TECHNICAL FIELD

The present invention relates to a hollow mold for receiving a liquid crystal panel and a diffuser plate and a liquid crystal display (LCD) including the hollow mold.

BACKGROUND

Liquid crystal displays (LCDs) are one of the most widely used flat panel displays (FPDs). An LCD typically includes two substrates on which electrodes are formed, and a liquid crystal layer interposed between the two substrates. In the LCD, liquid molecules of the liquid crystal layer are rearranged by applying voltage to the electrodes and thus controlling the amount of light transmitted.

An LCD requires a plurality of components, including a liquid crystal panel, a diffuser plate, and a reflective sheet. Since a recent surge in the demand for LCDs has increased the need for mass production, LCD manufacturers are faced with the challenges of making the devices simpler and lighter and automating the manufacturing process of the devices.

In order to align and prevent the devices from moving, at least one mold for fixing and receiving the components, a top chassis, and a bottom chassis are used.

For example, one mold may be used to accommodate receiving the liquid crystal panel, and another mold may be used to accommodate receiving the diffuser plate. However, if two separate molds are used to accommodate the liquid crystal panel and the diffuser plate, respectively, the number of parts included in an LCD may be increased, which, in turn, increases the size of the LCD.

A reflective sheet having a complicated structure may be adopted in order to effectively reflect light emitted from illuminating lamps and may be manually fixed to the top surface of a mold. However, since the structure of the reflective sheet may be complicated, it may require a considerable amount of time to manually fix the reflective sheet to the mold.

In addition, a top chassis and a bottom chassis may be manufactured using, for example, a press/injection processing method. However, the press/injection processing method may not be desirable in terms of cost savings since it uses numerous molds.

In this regard, it is desirable to adopt a simplified structure and reduce the manufacturing cost.

SUMMARY

In different embodiments, the present invention provides 1) a liquid crystal display (LCD) which can accommodate a liquid crystal panel, a diffuser plate, and a reflective sheet, and 2) a hollow mold for receiving a liquid crystal panel and a diffuser plate, the hollow mold being included in the LCD.

According to an aspect of the present invention, a hollow mold for receiving a liquid crystal panel and a diffuser plate includes an outer side surface, a top surface, an inner side surface including a first step which is formed in a stepped shape to define an upper receiving space, a second step which defines a lower receiving space, and at least two pairs of inclined surfaces facing each other which slope downward from the second step, and a bottom surface.

According to another aspect of the invention, an LCD includes the hollow mold above; a liquid crystal panel disposed in the upper receiving space; a diffuser plate disposed in the lower receiving space; a support disposed under and adapted to support the diffuser plate; a reflective sheet; and a bottom chassis coupled to the hollow mold and adapted to accommodate the hollow mold, the support and the reflective sheet.

According to another aspect of the present invention, an LCD includes a plate; a bottom chassis having a plurality of sidewalls, the sidewalls being coupled to the plate and adapted to receive a plurality of lamps, a diffuser plate, and optical sheets; a middle chassis having a plurality of sidewalls coupled to the sidewalls of the bottom chassis and adapted to receive a liquid crystal panel on a top surface thereof; and a top chassis covering and coupled to the sidewalls of the middle chassis and the sidewalls of the bottom chassis in a direction from a front surface of the liquid crystal panel.

According to another aspect of the present invention, a method of assembling an LCD includes, providing a bottom chassis; disposing a reflective flat sheet for reflecting light on the bottom chassis; disposing a hollow mold adapted to receive a liquid crystal panel and a diffuser plate, the hollow mold comprising an outer side surface, a top surface, an inner side surface comprising a first step which is formed in a stepped shape to define an upper receiving space, a second step which defines a lower receiving space, and at least two pairs of inclined surfaces facing each other which slope downward from the second step, and a bottom surface, so as to fix the edges of reflective sheet by the inclined surfaces; disposing a diffuser plate in the upper receiving space; and disposing a liquid crystal panel in the upper receiving space.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The above and other features and advantages of the present invention will become more apparent by describing in detail preferred embodiments thereof with reference to the attached drawings, in which.

DETAILED DESCRIPTION

Figure 1:
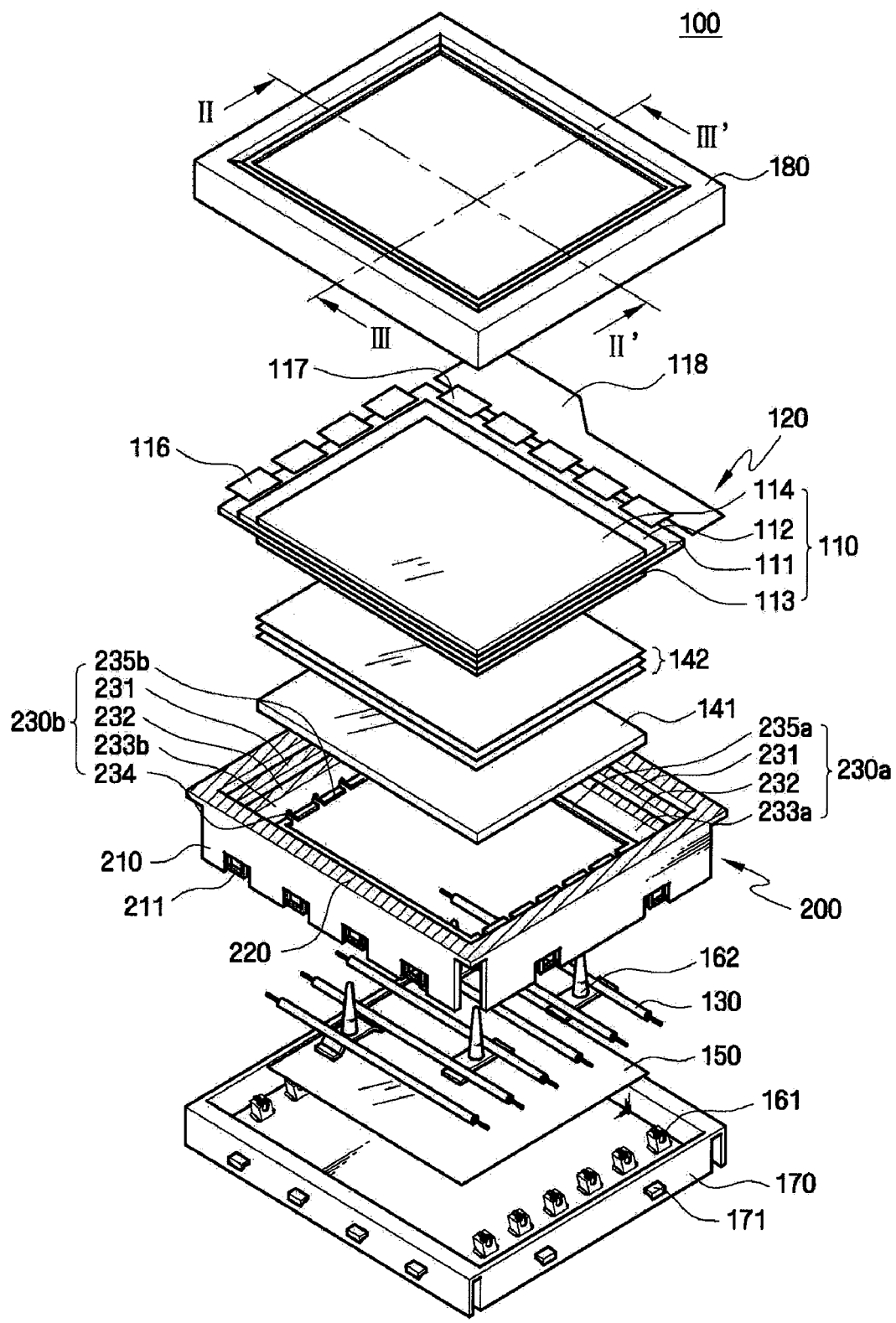
FIG. 1 is an exploded perspective view of a liquid crystal display (LCD) according to a first embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. Like reference numerals in the drawings denote like elements, and thus their description will be omitted.

Embodiments of the present invention will hereinafter be described in detail with reference to the accompanying drawings.

Figure 2:
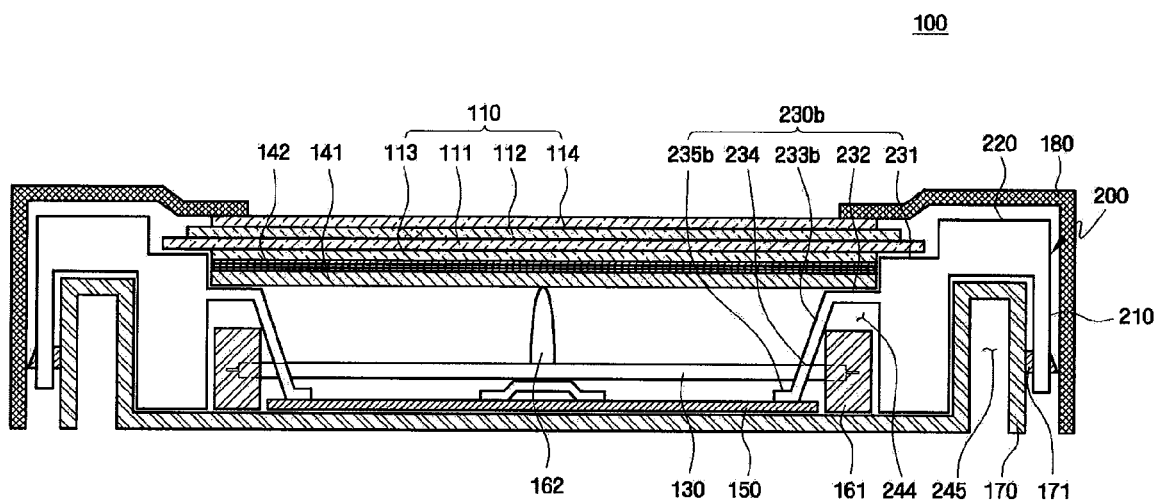
FIG. 2 is a horizontal cross-sectional view of the LCD taken along a line II-II' of FIG. 1.
Figure 3:
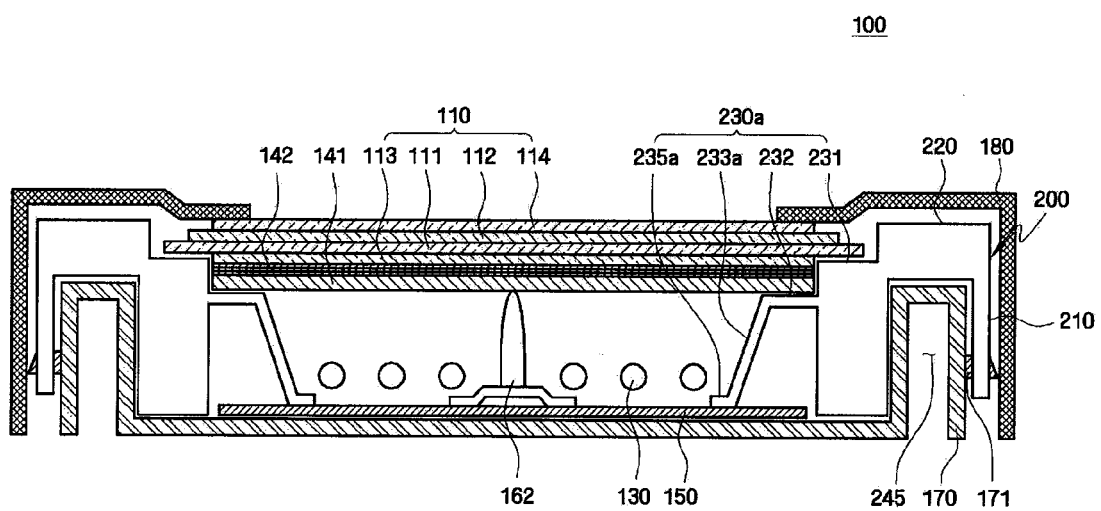
FIG. 3 is a vertical cross-sectional view of the LCD taken along a line III-III' of FIG. 1.

FIG. 1 is an exploded perspective view of an LCD 100 according to a first embodiment of the present invention. FIG. 2 is a horizontal cross-sectional view of LCD 100 taken along a line II-II' of FIG. 1. FIG. 3 is a vertical cross-sectional view of LCD 100 taken along a line III-III' of FIG. 1. The term 'horizontal,' as used herein, denotes a direction parallel to a long side of LCD 100, and the term 'vertical' denotes a direction parallel to a short side of LCD 100.

Referring to FIG. 1, LCD 100 includes a liquid crystal panel assembly 120, a diffuser plate 141, a reflective sheet 150, a top chassis 180, a hollow mold 200 for receiving liquid crystal panel 110 and diffuser plate 141, and a bottom chassis 170.

Liquid crystal panel assembly 120 includes a liquid crystal panel 110, which includes a thin-film transistor (TFT) substrate 111, a color filter substrate 112, a first polarizing plate 113 and a second polarizing plate 114, a liquid crystal (not shown), a gate tape carrier package 116, a data tape carrier package 117, and a printed circuit board (PCB) 118.

Specifically, liquid crystal panel 110 includes TFT substrate 111 which includes a plurality of gate lines (not shown), a plurality of data lines (not shown), a TFT array (not shown) and pixel electrodes (not shown), color filter substrate 112 which includes a black matrix (not shown) and common electrodes (not shown) and faces TFT substrate 111, first polarizing plate 113 which is disposed under TFT substrate 111, and second polarizing plate 114 which is disposed on color filter substrate 112.

Liquid crystal panel 110 including sequentially stacked flat board-shaped substrates is disposed in hollow mold 200, which will be described later. Specifically, liquid crystal panel 110 is disposed on a first step 231, which defines an upper receiving space of hollow mold 200 and performs a first supporting function, where liquid crystal panel 110 occupies the upper receiving space.

Gate tape carrier package 116 is connected to each of the gate lines (not shown) formed in TFT substrate 111, and data tape carrier package 117 is connected to each of the data lines (not shown) formed in TFT substrate 111.

Various driving parts for processing a gate driving signal and a data driving signal are mounted on PCB 118 so that the gate driving signal can be input to gate tape carrier package 116 and the data driving signal can be input to data carrier package 117.

Lamps 130 may be light emitting diodes (LEDs), cold cathode fluorescent lamps (CCFLs), or external electrode fluorescent lamps (EEFLs). Lamps 130 are separated a predetermined distance away from one another, connected in parallel to one another on an equiphase plane, i.e., in a single planar arrangement, providing direct illumination.

Lamps 130 may be arranged in a horizontal direction of liquid crystal panel 120 in order to obtain uniform luminance.

Referring to FIG. 2, lamps 130 are inserted and fixed to sockets 161 and are exposed to outside vertical inclined surfaces 233b via through-grooves 234 formed in hollow mold 200.

Referring to FIGS. 1 through 3, diffuser plate 141, which is disposed above lamps 130, diffuses light emitted from lamps 130, thereby enhancing luminance uniformity.

Diffuser plate 141 is formed in a flat-board shape and disposed in hollow mold 200. Specifically, diffuser plate 141 is disposed on a second step 232, which defines a lower receiving space of hollow mold 200 and performs a supporting function for diffuser plate 141. Therefore, diffuser plate 141 occupies the lower receiving space. In addition, diffuser plate 141 is supported by a plurality of supports 162 in order to prevent drooping, which may occur at the center part of diffuser plate 141.

A plurality of optical sheets 142 is disposed on diffuser plate 141. Optical sheets 142 diffuse and collect the light emitted from lamps 130 and transmitted through diffuser plate 141. Optical sheets 142 are composed of a diffusion sheet, a first prism sheet, and a second prism sheet. The diffusion sheet is disposed on diffuser plate 141 and enhances the luminance and uniformity of light incident from lamps 130.

The first and second prism sheets, which collect the light diffused by the diffusion sheet and output the collected light, are disposed on the diffusion sheet. If sufficient luminance and viewing angles can be secured using the first prism sheet, the second prism sheet may be omitted.

Optical sheets 142 are disposed on diffuser plate 141 and thus directly contact liquid crystal panel 110. Therefore, in LCD 100, no spacer is interposed between optical sheets 142 and liquid crystal panel 100. Diffuser plate 141, optical sheets 142 and liquid crystal panel 110 are sequentially stacked from bottom to top in this order, thereby reducing the thickness of LCD 100. Diffuser plate 141 and optical sheets 142 are disposed in the lower receiving space defined by second step 232, and liquid crystal panel 110 is disposed in the upper receiving space defined by first step 231 as described above. The difference between heights of first step 231 and second step 232 may be equal to a sum of thicknesses of diffuser plate 141 and optical sheets 142 so that optical sheets 142 disposed on diffuser plate 141 can directly contact and thus support liquid crystal panel 110.

Reflective sheet 150 is disposed under lamps 130 and reflects light radiating downward from lamps 130 back in an upward direction.

Reflective sheet 150 may be manufactured by dispersing a white pigment, such as titanium oxide, on a synthetic resin sheet, and bubbles for scattering light may be distributed over the synthetic resin sheet.

Reflective sheet 150 is shaped like a flat sheet which does not include inclined surfaces since inclined surfaces 233a and 233b of hollow mold 200, which will be described later, perform a lateral reflection function on behalf of reflective sheet 150.

Referring to FIG. 3, reflective sheet 150 is fixed by hollow mold 200 and supports 162 without requiring an adhesive element. Thus, the edges of reflective sheet 150 may be fixed by the inclined surfaces 233a and 233b of hollow mold 200. In addition, inclined surfaces 233a and 233b may further include fixing portions 235a and 235b, respectively, and the edges of reflective sheet 150 may be fixed by fixing portions 235a and 235b through surface contact. A center part of reflective sheet 150 is fixed by supports 162, which will be described later.

As described above, reflective sheet 150 is shaped like a flat sheet and fixed by inclined surfaces 233a and 233b or fixing portions 235a and 235b of hollow mold 200 and supports 162. Therefore, the shape and fixing process of reflective sheet 150 can be simplified. Thus, since inclined surfaces 233a and 233b perform the lateral reflection function, reflective sheet 150 is not required to perform the lateral reflection function. Accordingly, there is no need to form a plurality of folding lines in reflective sheet 150 in order to provide inclined surfaces. Furthermore, a complicated process of fixing reflective sheet 150 using an additional adhesive element, such as a double-sided tape, is not needed. Consequently, since reflective sheet 150 is shaped like a flat sheet, the size of reflective sheet 150 can be reduced, which, in turn, saves material costs. In addition, reflective sheet 150 can be easily and quickly fixed in place. A reduction in the size and assembly time associated with the shape of reflective sheet 150 may also be achieved in the following embodiments of the present invention.

Referring back to FIG. 2, sockets 161 may be fixed to an alignment plate (not shown), which is disposed on a top surface of a bottom chassis 170, and thus be disposed on bottom chassis 170.

Lamps 130 are inserted into lamp connection portions (not shown) of fixed sockets 161, and hollow mold 200 is disposed over sockets 161. Therefore, sockets 161 are not exposed to the outside of inclined surfaces 233a and 233b. Instead, sockets 161 are disposed in socket coupling grooves 244, which are formed in a vertical bottom surface (see 240b of FIG. 7) of hollow mold 200.

Supports 162, which are formed at the center part of a bottom surface of reflective sheet 150, are fixed to bottom chassis 170 and support diffuser plate 141 while fixing the center part of reflective sheet 150. Supports 162 may be formed of transparent materials in order to minimize a loss of light emitted from lamps 130.

Referring back to FIG. 1, bottom chassis 170 includes sidewalls which are rectangular and formed along the edges of a bottom surface thereof. Hollow mold 200, in which liquid crystal panel 110, optical sheets 142 and diffuser plate 141 are disposed, lamps 130, and reflective sheet 150 are all received above and/or inside the sidewalls of bottom chassis 170.

The sidewalls of bottom chassis 170 may be shaped like rectangular frames perpendicular to the bottom surface of bottom chassis 170. Bottom chassis 170 may include a top surface having a predetermined width and inner and outer sidewalls, which are orthogonal to the top surface in order to accommodate the hollow mold 200, and may be coupled to hollow mold 200.

The top surface of bottom chassis 170 is covered by hollow mold 200. For example, the top surface of bottom chassis 170 contacts bottom chassis coupling grooves 245, each of which is one of two concave portions formed in each of bottom surfaces (see 240a of FIG. 5 and 240b of FIG. 7) of hollow mold 200. In this embodiment, chassis coupling grooves 245 are formed adjacent to each of outer side surfaces 210 of hollow mold 200.

Coupling protrusions 171 may be formed in the outer sidewalls of bottom chassis 170, which are orthogonal to the top surface of bottom chassis 170 and may be coupled to coupling grooves 211 of hollow mold 200. The shape of bottom chassis 170 may vary according to a method of accommodating liquid crystal panel assembly 120 in bottom chassis 170.

Top chassis 180 is disposed on liquid crystal panel 110 to cover a top surface of liquid crystal panel 110, which is received in hollow mold 200. A window exposing liquid crystal panel assembly 120 to the outside is formed on a top surface of top chassis 180.

Top chassis 180 may be coupled to bottom chassis 170 by hooks (not shown) and/or screws (not shown), or any other suitable method.

Figure 6:
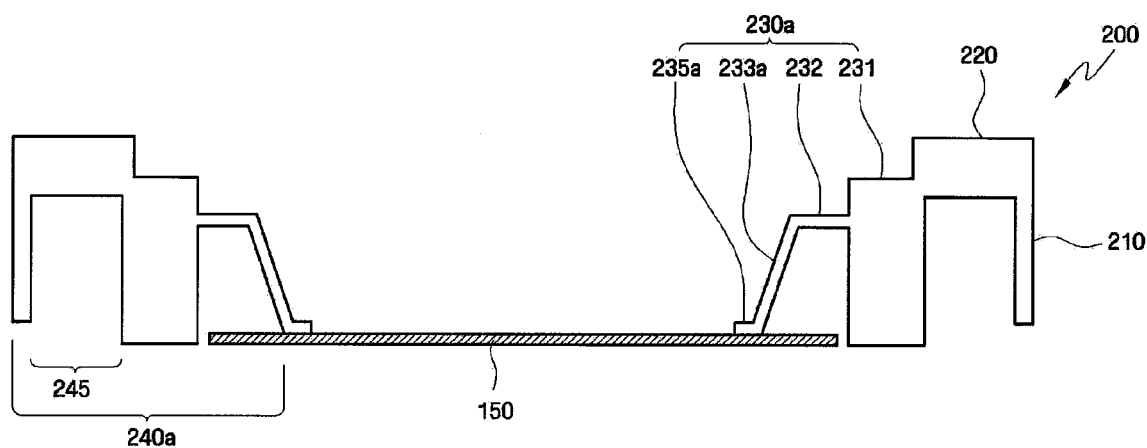
FIG. 6 is a cross-sectional view of the hollow mold taken along a line VI-VI' of FIG. 4.
Figure 8:
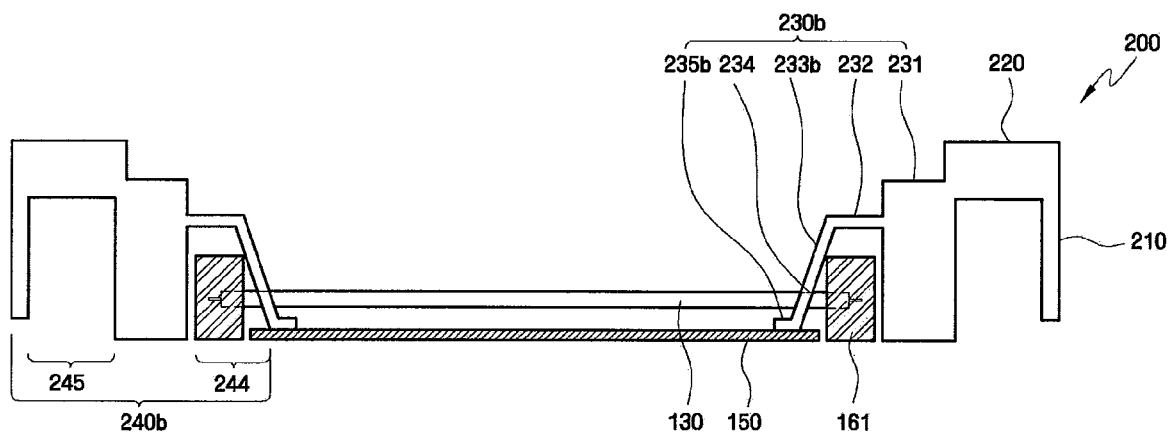
FIG. 8 is a cross-sectional view of the hollow mold taken along a line VIII-VIII' of FIG. 4.

Hollow mold 200 includes outer side surfaces 210, a top surface 220, inner side surfaces 230a and 230b, and bottom surfaces (see 240a of FIG. 6 and 240b of FIG. 8). For example, each of inner side surfaces 230a and 230b includes first step 231, which is formed in a stepped shape to define the upper receiving space and perform a supporting function for receiving liquid crystal panel 110, second step 232, which defines the lower receiving space and performs a supporting function for receiving optical sheets 142 and diffuser plate 141, and inclined surface 233a or 233b, which slopes downward from second step 232.

Liquid crystal panel 110 is disposed in the upper receiving space of hollow mold 200, which is defined by first step 231, and optical sheets 142 and diffuser plate 141 are disposed in the lower receiving space which is defined by second step 232.

Inclined surfaces 233a and 233b, which may be formed of light reflecting resin or other material, reflect light emitted from lamps 130 and fix reflective sheet 150. According to LCD 100, liquid crystal panel 110 and diffuser plate 141 are disposed in hollow mold 200 for receiving both liquid crystal panel 110 and diffuser plate 141. Therefore, the number of parts required may be reduced. Additionally, since reflective sheet 150 is flat, material costs may be saved. Reflective sheet 150 can also be easily fixed by inclined surfaces 233a and 233b of hollow mold 200. Hence, the processing time required to fix reflective sheet 150 may be reduced.

Figure 4:
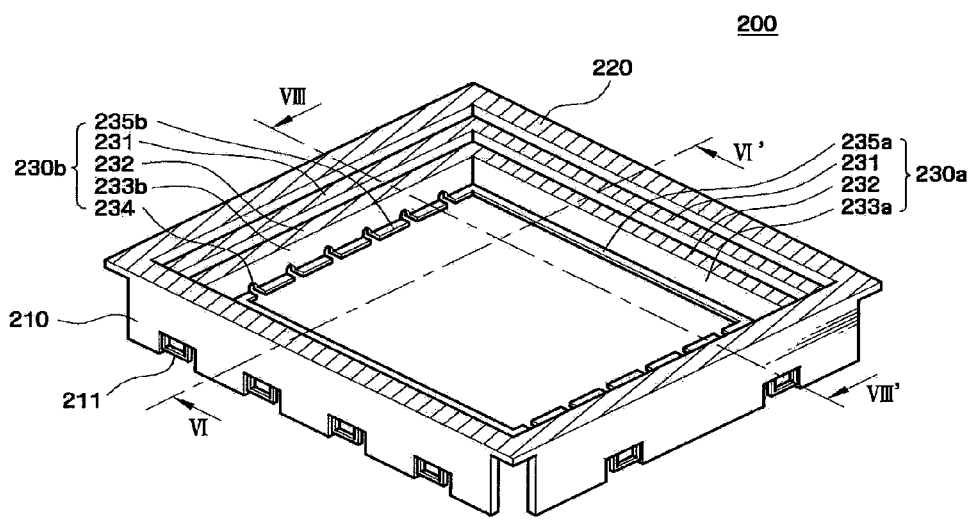
FIG. 4 is a perspective view of a hollow mold according to a first embodiment of the present invention.
Figure 5:
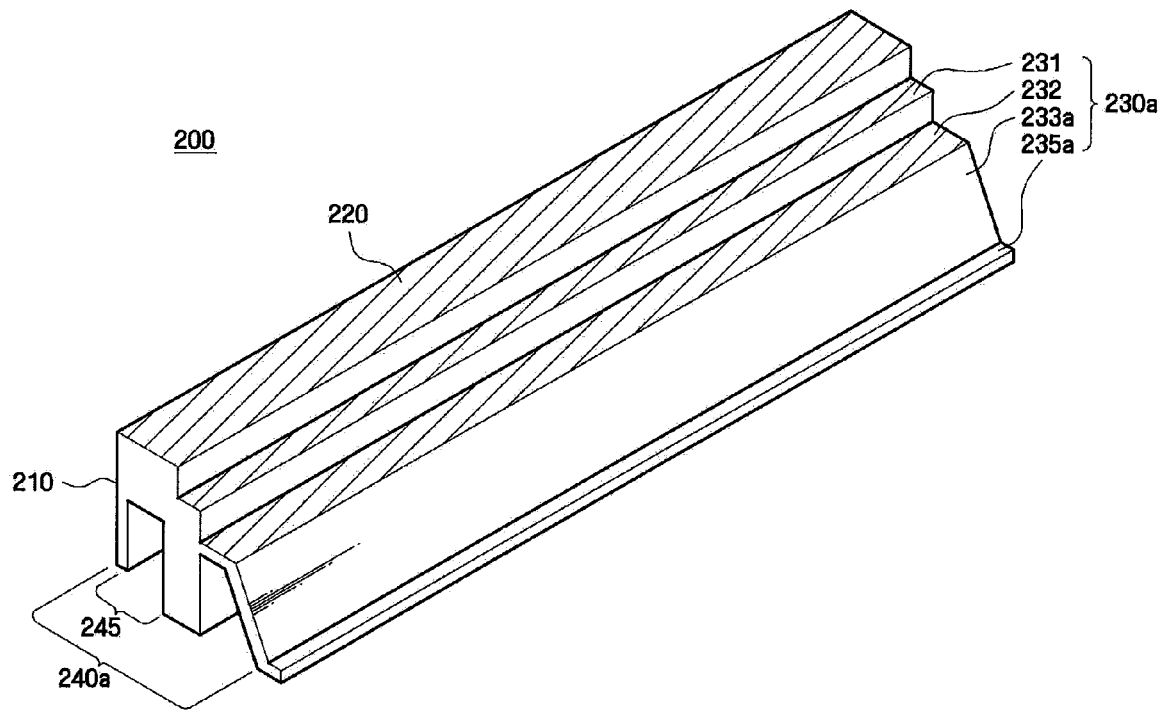
FIG. 5 is a perspective view illustrating a portion of horizontal inner side surfaces of the hollow mold of FIG. 4.
Figure 7:
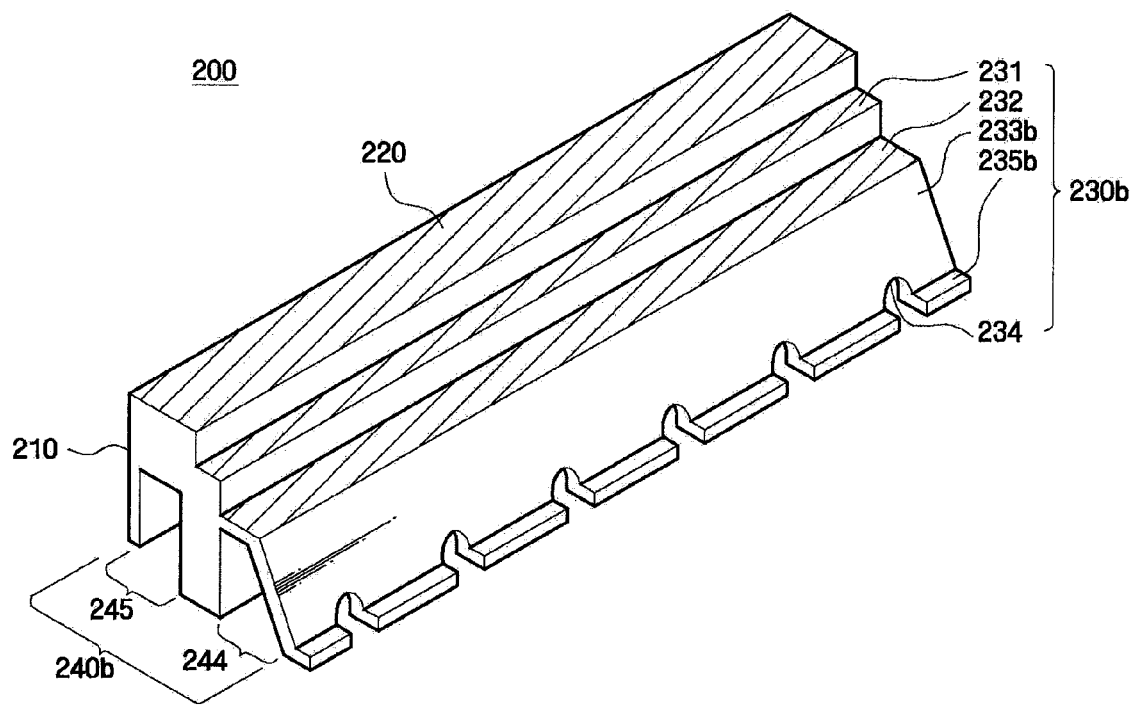
FIG. 7 is a perspective view illustrating a portion of vertical inner side surfaces of the hollow mold of FIG. 4.

A hollow mold according to a first embodiment of the present invention will now be described in further detail with reference to FIGS. 4 through 8. FIG. 4 is a perspective view of hollow mold 200 according to a first embodiment of the present invention. FIG. 5 is a perspective view illustrating a portion of horizontal inner side surfaces 230a of hollow mold 200. FIG. 6 is a cross-sectional view of hollow mold 200 taken along a line VI-VI' of FIG. 4. FIG. 7 is a perspective view illustrating a portion of vertical inner side surfaces 230b of hollow mold 200. FIG. 8 is a cross-sectional view of hollow mold 200 taken along a line VIII-VIII' of FIG. 4. Referring to FIG. 4, hollow mold 200 has a hollow shape in which inner side surfaces 230a and 230b face inwardly. Top surface 220 is formed along top edges of outer side surfaces 210 and shaped like a rectangular band which is orthogonal to outer side surfaces 210. Specifically, top surface 220, first step 231, and second step 232 of the hollow mold 200 are all shaped like rectangular bands and formed in a stepped shape. Lower portions of inclined surfaces 233a and 233b, which slope downward from second step 232, form an open window.

Outer side surfaces 210 are vertically formed at the outermost edges of hollow mold 200 and cover the outer sidewalls of bottom chassis 170, illustrated in FIG. 1, when hollow mold 200 is brought in contact with bottom chassis 170.

Coupling grooves 211 are formed in outer side surfaces 210 in order to be coupled to coupling protrusions 171 which are formed in the outer sidewalls of bottom chassis 170. More than one coupling protrusion 171 may be formed, and coupling grooves 211 may fix hollow mold 200 to bottom chassis 170 at respective coupling protrusions 171 and may be separated a predetermined distance away from one another.

Bottom chassis coupling groove 245 of hollow mold 200 may have a width equal to a width of the top surface of bottom chassis 170 so that hollow mold 200 can be securely positioned over bottom chassis 170.

First step 231 is formed lower than top surface 220 to have a different height from top surface 220 and is shaped like a rectangular band which protrudes further inward of hollow mold 200 than top surface 220. Therefore, first step 231 defines the upper receiving space of hollow mold 200 and performs a supporting function for liquid crystal panel 110. Liquid crystal panel 110 is disposed in first step 231 and occupies the upper receiving space of hollow mold 200 defined by first step 231.

Second step 232 is formed lower than first step 231 to have a different height from first step 231 and is shaped like a rectangular band which protrudes further inward of hollow mold 200 than first step 231. Therefore, second step 232 defines the lower receiving space of hollow mold 200 and performs a supporting function for diffuser plate 141. Diffuser plate 141 is disposed in second step 232 and occupies the lower receiving space defined by second step 232.

Referring to FIGS. 6 and 8, inner side surfaces 230a and 230b of the hollow mold 200 are composed of a pair of horizontal inner side surfaces 230a that face each other and a pair of vertical inner side surfaces 230b that face each other.

Inclined surfaces 233a and 233b extend and slope downward from an edge of the second step 232.

Referring to FIGS. 5 and 6, horizontal inclined surfaces 233a of horizontal inner side surfaces 230a reflect light emitted from lamps 130 to prevent the emitted light from leaking outward laterally in the horizontal direction, and fix reflective sheet 150.

Horizontal inclined surfaces 233a of horizontal inner side surfaces 230a fix two sides of reflective sheet 150 which face each other in a horizontal direction.

Reflective sheet 150 may be supported by horizontal inclined surfaces 233a. Horizontal inclined surfaces 233a may further include fixing portions 235a formed parallel to a horizontal bottom surface 240a, and the edges of reflective sheet 150 may be fixed by fixing portions 235a through surface contact.

Horizontal bottom surface 240a may be a flat surface, the whole surface of which is closed. Alternatively, horizontal bottom surface 240a may be a concavo-convex surface having two concave portions in order to reduce material costs and weight. Of the two concave portions, a concave portion, which is adjacent to each of the outer side surfaces 210, is one of bottom chassis coupling grooves 245. Concave surfaces of bottom chassis coupling grooves 245 contact the top surface of bottom chassis 170 of FIG. 1 and securely couple hollow mold 200 to bottom chassis 170.

Referring to FIGS. 7 and 8, vertical inclined surfaces 233b of vertical inner side surfaces 230b of hollow mold 200 reflect light emitted from lamps 130 to prevent the emitted light from leaking outward laterally in the vertical direction and fix reflective sheet 150. Vertical inclined surfaces 233b may further include fixing portions 235b formed parallel to vertical bottom surface 240b, and reflective sheet 150 may be fixed by fixing portions 235b. Fixing portions 235b formed on vertical inclined surfaces 233b may be omitted in consideration of the relationship with through-grooves 234. Therefore, reflective sheet 150 may be directly fixed by vertical inclined surfaces 233b without using fixing portions 235b.

Horizontal and vertical inclined surfaces 233a and 233b may be formed at an identical slope and of an identical material. However, considering that both ends of lamps 130 are non-luminous areas, vertical inclined surfaces 233b may have a different slope than horizontal inclined surfaces 233a.

Horizontal and vertical inclined surfaces 233a and 233b may be formed of light reflecting resin, for example, white polycarbonate (PC), in order to perform the reflection function. However, both surfaces may be formed of any material that has suitable reflectivity.

Through-grooves 234 are passages penetrating vertical inclined surfaces 233b through which lamps 130 can be coupled to sockets 234. Specifically, through-grooves 234 are formed opposite to each other in lower portions of vertical inner side surfaces 230b that face each other, and both ends of lamps 130 may be inserted into through-grooves 234 that face each other.

Vertical bottom surface 240b may be a concavo-convex surface having two concave portions. Of the two concave portions, one concave portion, which is formed along a rear surface of each of the vertical inclined surfaces 233b, is one of socket coupling grooves 244. Sockets 161 are accommodated in socket coupling grooves 244 and thus are not exposed to the outside of vertical inclined surfaces 233b. Lamps 130 inserted into sockets 161 penetrate through-grooves 234. Hence, dark areas of both ends of lamps 130 are blocked by vertical inclined surfaces 233b and thus cannot be seen.

Of the two concave portions, another concave portion, which is adjacent to each of the outer side surfaces 210, is one of bottom chassis coupling grooves 245. Bottom chassis coupling grooves 245 of horizontal bottom surfaces 240a and 240b contact the top surface of bottom chassis 170 and securely align hollow mold 200 to bottom chassis 170.

For hollow mold 200, the two steps, i.e., first and second steps 231 and 232, are formed in one mold in a stepped shape and define the upper and lower receiving spaces, respectively.

Therefore, the number of parts required can be reduced. In addition, reflective sheet 150 can be easily fixed by inclined surfaces 233*a* and 233*b*, and more specifically, by fixing portions 235*a* and 235*b* of inclined surfaces 233*a* and 233*b*.

Figure 9:
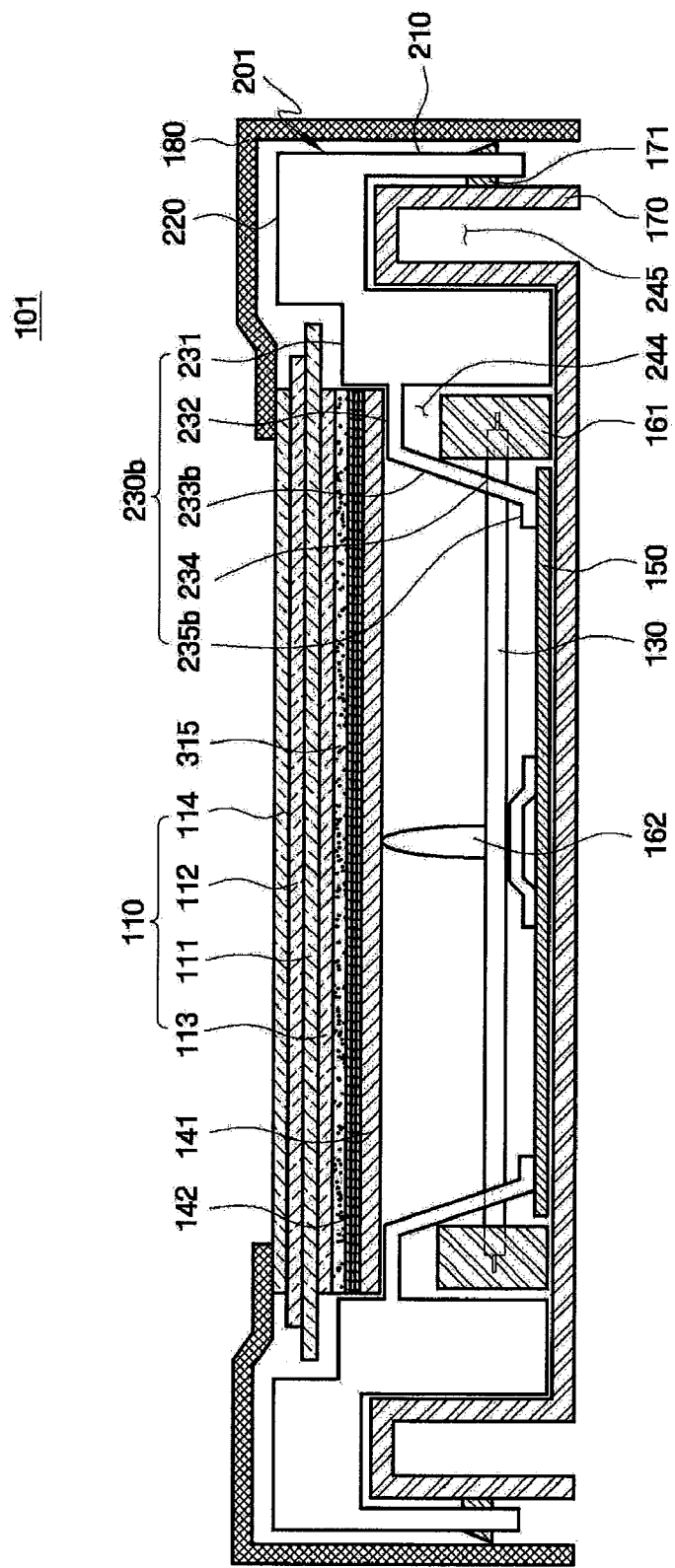
FIG. 9 is a horizontal cross-sectional view of an LCD according to a second embodiment of the present invention.
Figure 10:
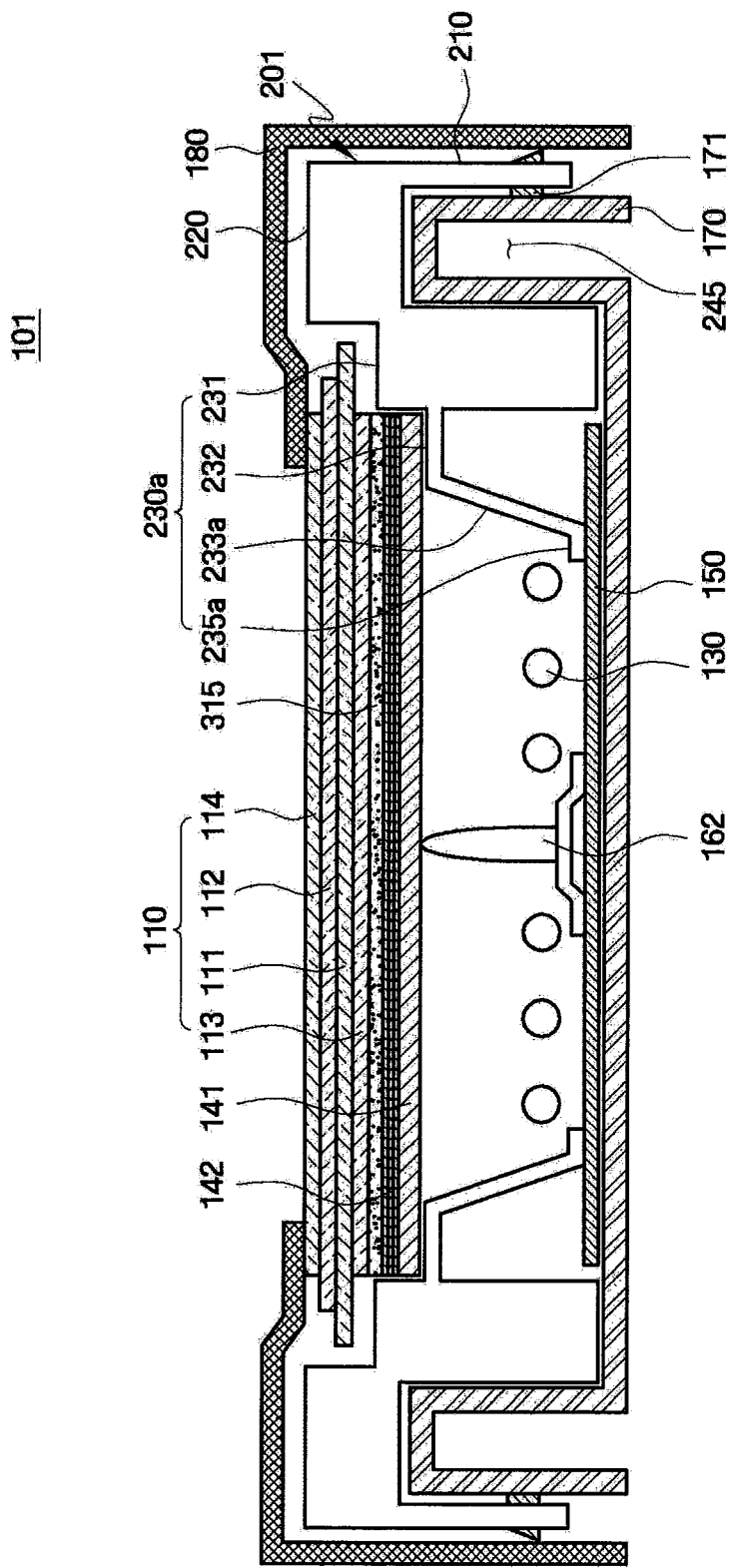
FIG. 10 is a vertical cross-sectional view of the LCD of FIG. 9.

An LCD according to a second embodiment of the present invention will now be described with reference to FIGS. 9 and 10. FIG. 9 is a horizontal cross-sectional view of an LCD 101 according to a second embodiment of the present invention. FIG. 10 is a vertical cross-sectional view of LCD 101. For convenience of description, like reference numerals in the drawings denote like elements, and thus their description will be omitted. LCD 101 has the same structure as LCD 100 except for the following elements.

Referring to FIGS. 9 and 10, LCD 101 further includes optical sheets 142 adhered to liquid crystal panel 110 using an adhesive layer 315. Specifically, in LCD 101, a second prism sheet of optical sheets 142 is adhered to a first polarizing plate 113 of liquid crystal panel 110 using adhesive layer 315.

As in the first embodiment, optical sheets 142 are disposed on diffuser plate 141, and adhesive layer 315 is evenly coated on the second prism sheet which is disposed on a top surface of optical sheets 142. In this case, adhesive layer 315 may be transparent in order not to adversely affect the visibility of LCD 101.

Adhesive layer 315 adheres liquid crystal panel 110 to optical sheets 142 in order to fix liquid crystal panel 110 and optical sheets 142. In this case, optical sheets 142 and diffuser plate 141 are all adhered by adhesive layer 315 to liquid crystal panel 110. Hence, liquid crystal panel 110, optical sheets 142, and diffuser plate 141 may be integrated.

Adhesive layer 315 may be coated on the entire top surface of optical sheets 142. Alternatively or in addition to, adhesive layer 315 may be coated along the edges of optical sheets 142, unlike that which is illustrated in FIG. 9. The thickness and size of adhesive layer 315 coated on optical sheets 142 are not limited as long as adhesive layer 315 can adhere optical sheets 142 to liquid crystal panel 110.

As in the first embodiment, liquid crystal panel 110 is disposed on first step 231 of a hollow mold 201, which defines an upper receiving space and performs a supporting function for receiving liquid crystal panel 110, and diffuser plate 141 is disposed on second step 232 of hollow mold 201, which defines a lower receiving space and performs a supporting function for receiving diffuser plate 141. In addition, a reflective sheet 150 is fixed by fixing portions 235*a* and 235*b* of hollow mold 201. In this second embodiment, the difference between heights of first step 231 and second step 232 may be increased by a thickness of coated adhesive layer 315. However, the thickness of coated adhesive layer 315 is negligible.

According to LCD 101, liquid crystal panel 110 and diffuser plate 141 are adhered and fixed to each other by adhesive layer 315. Therefore, the time and effort required to separately assemble liquid crystal panel 110 and diffuser plate 141 in hollow mold 201 can be reduced, which makes it easier to dispose liquid crystal panel 110 and diffuser 141 in hollow mold 201. In addition, reflective sheet 150 is shaped like a flat sheet and fixed by inclined surfaces 233*a* and 233*b* of hollow mold 201, thereby reducing the assembly time required to fix reflective sheet 150.

Figure 11:
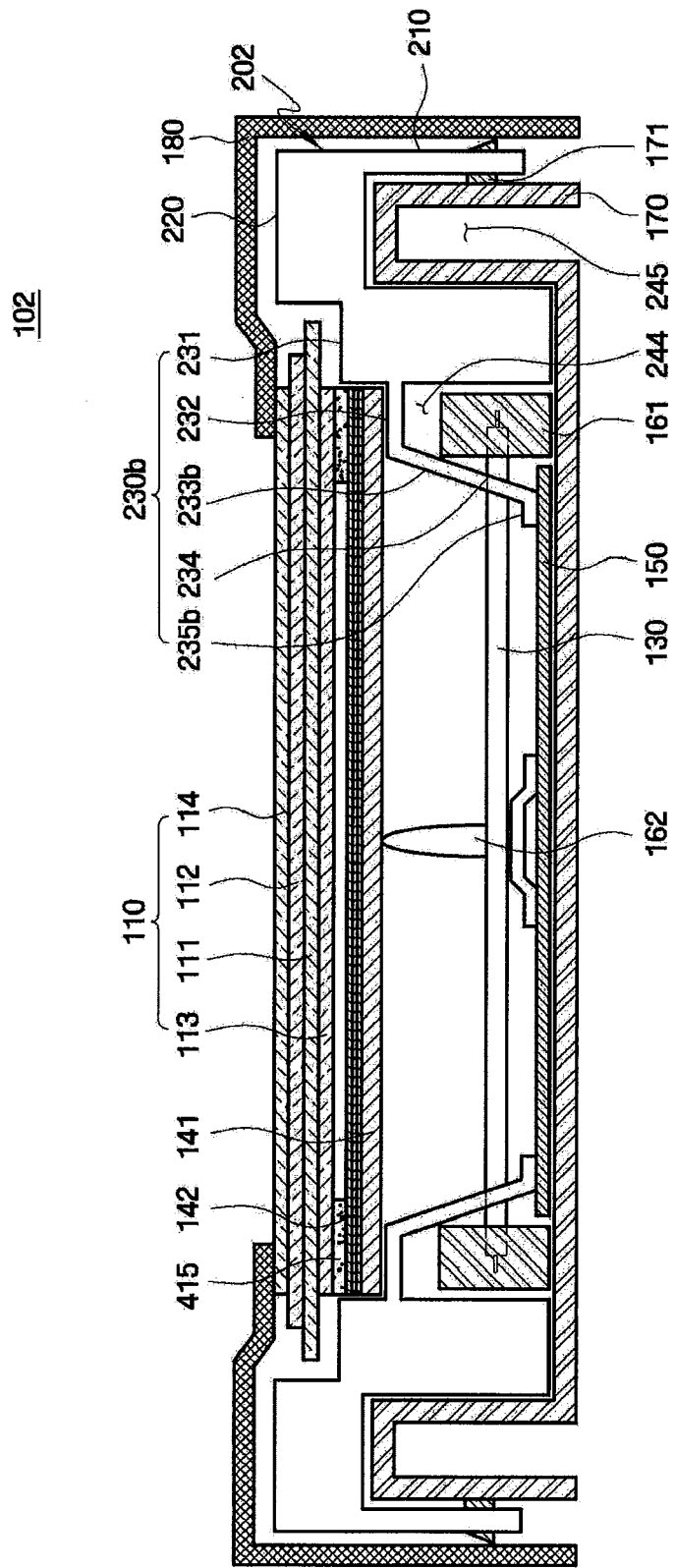
FIG. 11 is a horizontal cross-sectional view of an LCD according to a third embodiment of the present invention.
Figure 12:
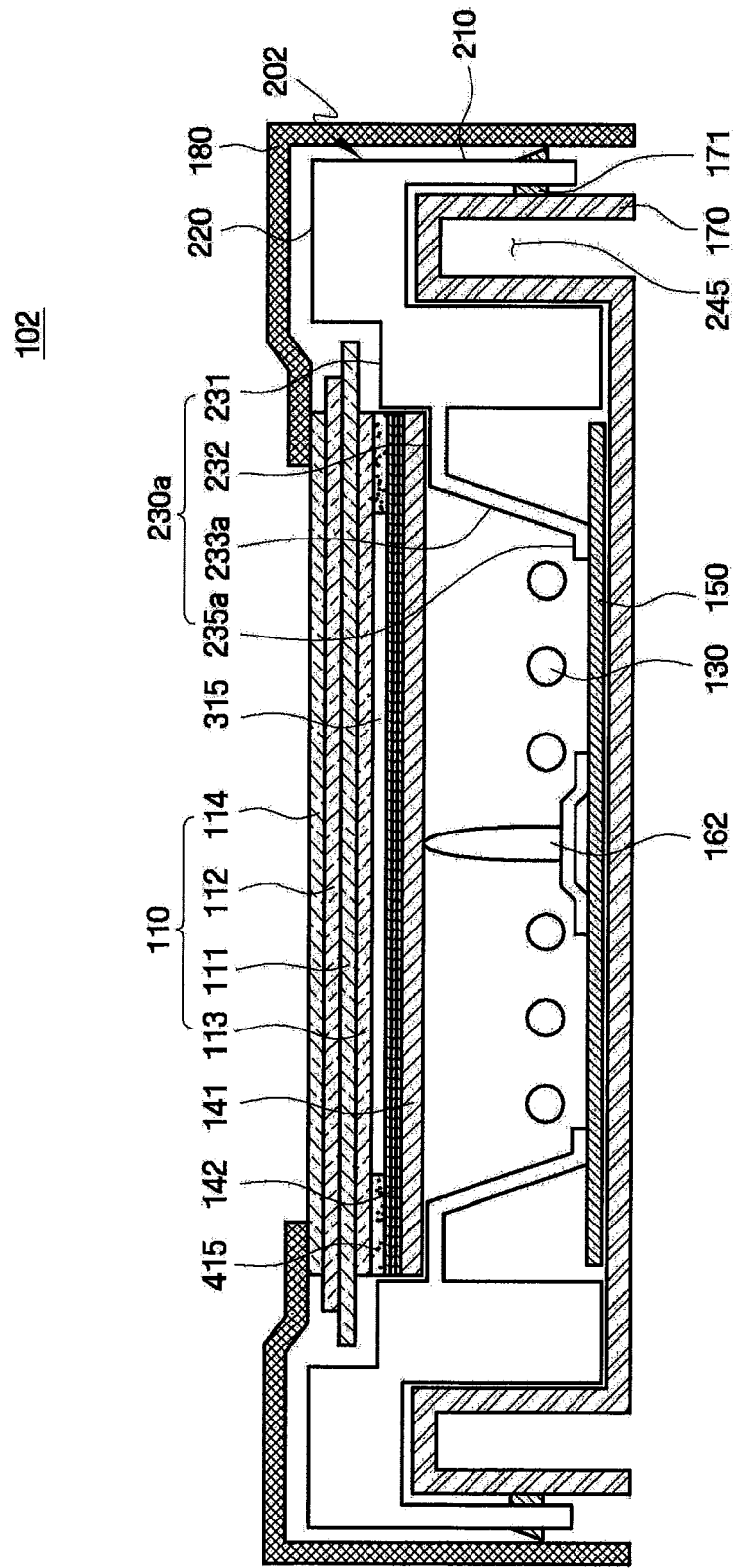
FIG. 12 is a vertical cross-sectional view of the LCD of FIG. 11.

An LCD 102 according to a third embodiment of the present invention will now be described with reference to FIGS. 11 and 12. FIG. 11 is a horizontal cross-sectional view of LCD 102. FIG. 12 is a vertical cross-sectional view of LCD 102. For convenience of description, like reference numerals in the drawings denote like elements, and thus their description will be omitted. LCD 102 has the same structure as LCD 100 except for the following elements. As illustrated in FIGS. 11 and 12, LCD 102 further includes a spacer 415 interposed between optical sheets 142, which are disposed on diffuser plate 141, and liquid crystal panel 110 and thus separates optical sheets 142 from liquid crystal panel 110.

As in the previous embodiments, diffuser plate 141 and optical sheets 142 are sequentially disposed on second step 232, which defines a lower receiving space of a hollow mold 202 for receiving liquid crystal panel 110 and diffuser plate 141, where first step 231 and second step 232 perform supporting functions for liquid crystal panel 110 and diffuser plate 141, respectively, from bottom to top in this order.

Unlike the previous embodiments, spacer 415 is disposed along the edges of optical sheets 142, and liquid crystal panel 110 is disposed on spacer 415. Spacer 415 may be shaped like a rectangular band having a predetermined thickness. In this case, the difference between heights of first step 231 and second step 232 of hollow mold 202 may be increased by the thickness of spacer 415. However, since the thickness of spacer 415 is still less than that of a middle mold that may be interposed between liquid crystal panel 110 and optical sheets 142 according to prior art, it does not present an obstacle to making LCD 102 thinner.

Spacer 415 may be formed of ductile polymer resin in order not to scratch liquid crystal panel 110 and optical sheets 142. Alternatively, spacer 415 may be formed of an elastic rubber material in consideration of work tolerance at the time of assembling top chassis 180. Spacer 415 may also be formed of an elastic and ductile material.

Since liquid crystal panel 110 is separated from optical sheets 142 using spacer 415, scratches, which may be caused by the friction between liquid crystal panel 110 and optical sheets 142, and damage to liquid crystal panel 110 and optical sheets 142, may be prevented. Accordingly, the formation of foreign matter, such as particulates, may be prevented.

The shape of reflective sheet 150, a method of fixing reflective sheet 150 and dispositions of liquid crystal panel 110 and diffuser plate 141, which have not been described in the present embodiment, are identical to the previous embodiments.

According to LCD 102, spacer 415 is interposed between liquid crystal panel 110 and optical sheets 142. Spacer 415 may prevent the creation of scratches and, accordingly, foreign matter in liquid crystal panel 110 and optical sheets 142. In addition, the thickness of LCD 102 may be reduced when liquid crystal panel 110 is separated from diffuser plate 141 or optical sheets 142 using spacer 415, rather than when using a middle mold, as may be used in prior art. Since hollow mold 202, which can receive both a liquid crystal panel 110 and a diffuser plate 141, is used, an assembling process can be simplified. Furthermore, since reflective sheet 150, shaped like a flat sheet, may be adopted, it can be easily fixed to hollow mold 202.

Figure 13:
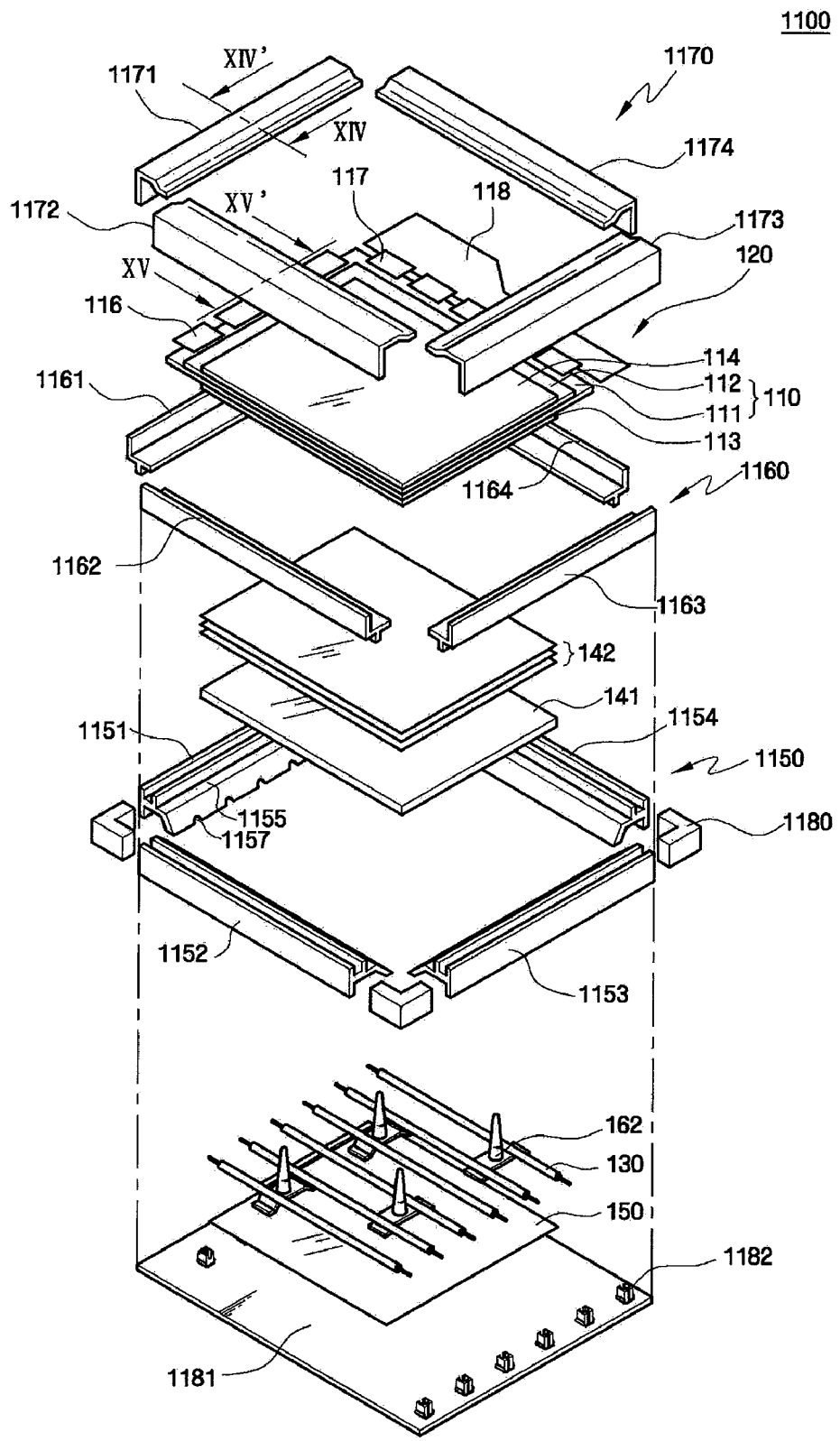
FIG. 13 is an exploded perspective view of an LCD according to a fourth embodiment of the present invention.
Figure 14:
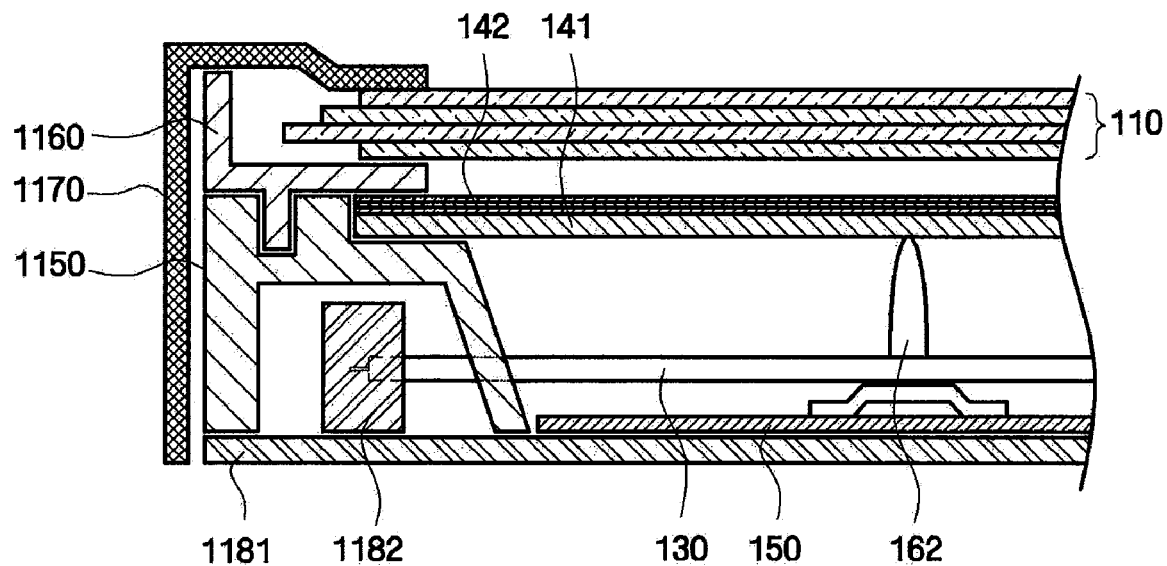
FIG. 14 is a cross-sectional view of the LCD taken along a line XIV-XIV' of FIG. 13 with the LCD assembled.
Figure 15:
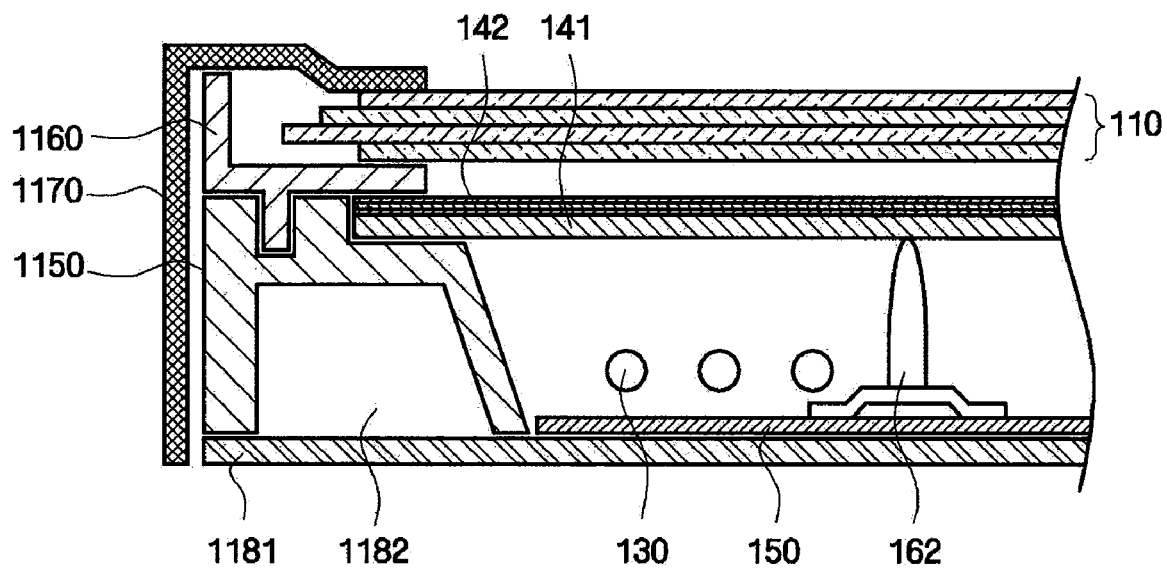
FIG. 15 is a cross-sectional view of the LCD taken along a line XV-XV' of FIG. 13 with the LCD assembled.

An LCD 1100 according to a fourth embodiment of the present invention will now be described with reference to FIGS. 13 through 22. FIG. 13 is an exploded perspective view of LCD 1100. FIG. 14 is a cross-sectional view of LCD 1100 taken along a line XIV-XIV' of FIG. 13 of LCD 1100 assembled. FIG. 15 is a cross-sectional view of LCD 1100 taken along a line XV-XV' of FIG. 13 of LCD 1100 assembled. For convenience of description, like reference numerals in the drawings denote like elements, and thus their description will be omitted.

Referring to FIG. 13, LCD 1100 may include liquid crystal panel assembly 120, a back light assembly, which may include lamps 130, diffuser plate 141, optical sheets 142, and reflective sheet 150, and receiving containers. In this case, the receiving containers may include, for example, a plate 1181, a top chassis 1170, a middle chassis 1160, and a bottom chassis 1150.

Liquid crystal panel assembly 120 may be received in middle chassis 1160, which will be described later.

The backlight assembly supplies light to liquid crystal panel 110 and may be disposed under liquid crystal panel 110. Referring to FIGS. 13 and 14, lamps 130 may be inserted and fixed, for example, in sockets 1182. Lamps 130 fixed to sockets 1182 may be exposed to the outside through through-grooves 1157 formed in sidewalls 1151 and 1154 of bottom chassis 1150, which will be described later, and emit light.

Reflective sheet 150 may be adhered to plate 1181. For example, an adhesive material may be interposed between reflective sheet 150 and plate 1181.

The backlight assembly described above may be received in bottom chassis 1150. Bottom chassis 1150 may include at least four sidewalls 1151 through 1154 which are coupled to plate 1181 and define a frame. Elements of the backlight assembly described above may be received within the sidewalls 1151 through 1154 of bottom chassis 1150 and plate 1181.

Figure 16:
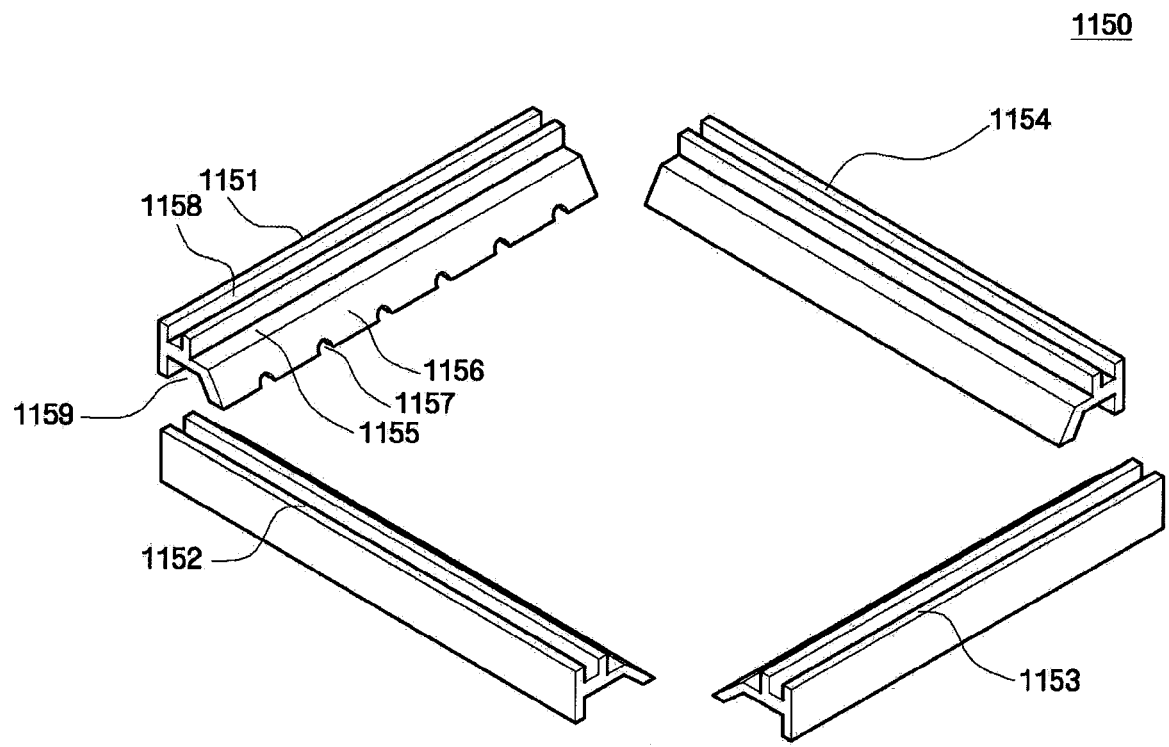
FIG. 16 is a perspective view of a bottom chassis illustrated in FIG. 13.
Figure 17:
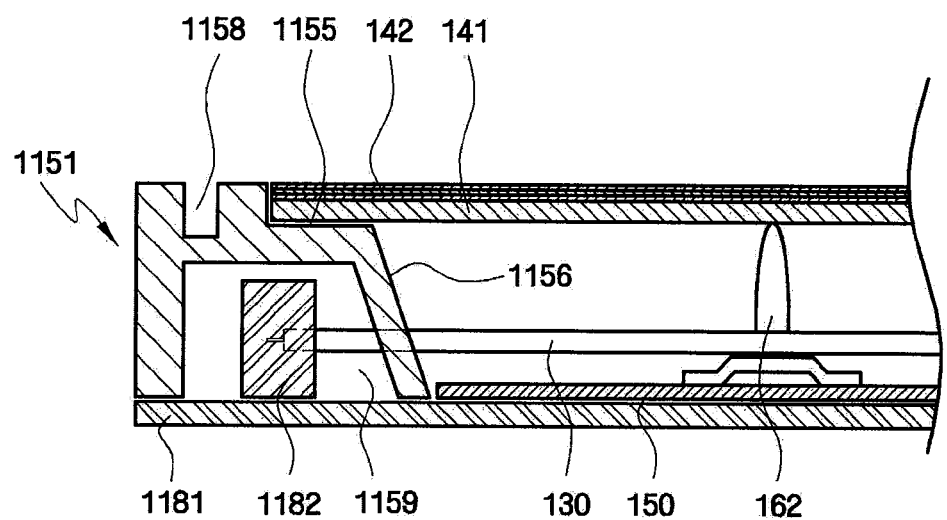
FIG. 17 is a cross-sectional view of the LCD taken along a line XIV-XIV' of FIG. 13 with the LCD partially assembled.
Figure 18:
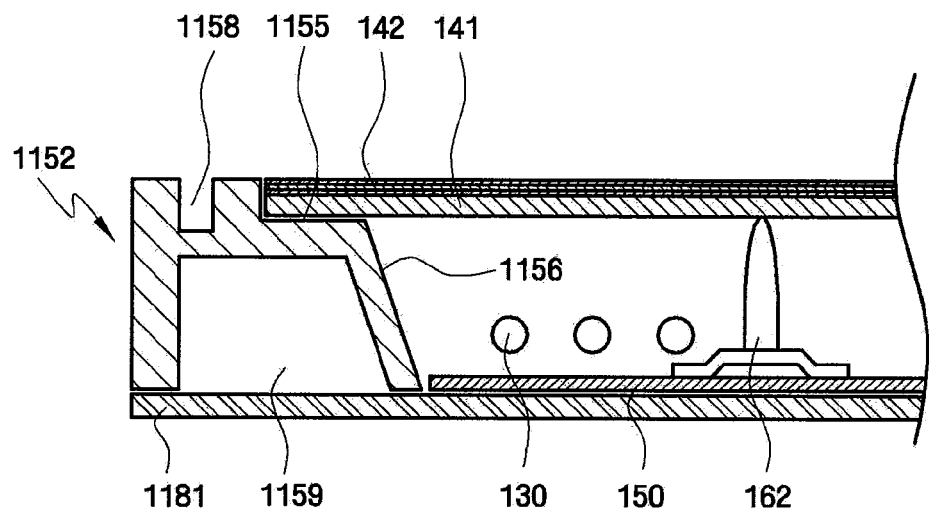
FIG. 18 is a cross-sectional view of the LCD taken along a line XV-XV' of FIG. 13 with the LCD partially assembled.

Bottom chassis 1150 will now be described in more detail with reference to FIGS. 16 through 18. FIG. 16 is a perspective view of bottom chassis 1150 illustrated in FIG. 13. FIG. 17 is a cross-sectional view of LCD 1100 taken along a line XIV-XIV' of FIG. 13 with LCD 1100 partially assembled. FIG. 18 is a cross-sectional view of LCD 1100 taken along a line XV-XV' of FIG. 13 with LCD 1100 partially assembled.

Sidewalls 1151 through 1154 may be perpendicularly coupled to the sides of plate 1181, and each of sidewalls 1151 through 1154 may include a supporting step 1155 having a predetermined width so that diffuser plate 141 and optical sheets 142 can be received on supporting step 1155. Each of sidewalls 1151 through 1154 may include an outer side surface, a top surface and an inner side surface, and may have a hollow shape in which the inner side surface is open. For example, each of sidewalls 1151 through 1154 may include supporting step 1155 formed in a stepped shape and an inclined surface 1156 which slopes downward from supporting step 1155.

The outer side surfaces of sidewalls 1151 through 1154 are vertically formed at the outermost edges of bottom chassis 1150 and are substantially aligned with respective edges of the sides of plate 1181. Predetermined grooves, for example, screw coupling grooves (not shown), may be formed in the outer side surfaces of sidewalls 1151 through 1154 and may be coupled to top chassis 1170 with screws (not shown).

The top surfaces of sidewalls 1151 through 1154 may be formed along upper edges of the outer side surfaces and may be orthogonal to the outer side surfaces. In addition, predetermined coupling grooves 1158 may be formed in the top surfaces in a lengthwise direction, i.e., a vertical direction, of sidewalls 1151 and 1153, and a horizontal direction of sidewalls 1152 and 1154. Middle chassis 1160, which will be described later, may be fixed to coupling grooves 1158.

The inner side surfaces of sidewalls 1151 through 1154 may respectively include supporting steps 1155, which are formed in a stepped shape from the top surfaces, and inclined surfaces 1156. Supporting steps 1155 may be formed lower than the top surfaces to have a predetermined difference in height from the top surfaces. In addition, supporting steps 1155 may be shaped like rectangular bands protruding inward and define a predetermined receiving space. As described above, diffuser plate 141 and optical sheets 142 may be received on supporting steps 1155.

Inclined surfaces 1156 may slope downward from edges of supporting steps 1155. Inclined surfaces 1156 reflect light emitted from lamps 130 to prevent the emitted light from laterally outward. For example, inclined surfaces 1156 may be formed of light reflecting resin, such as white polycarbonate (PC), in order to perform the reflection function. However, the present invention is not limited thereto.

Through-grooves 1157 may be formed in a pair of inclined surfaces 1156 facing each other, for example, in inclined surfaces 1156 of first and third sidewalls 1151 and 1153 of bottom chassis 1150, which face each other. Through-grooves 1157 are passages through which lamps 130 penetrating through-grooves 1157 can be coupled to sockets 1182. For example, through-grooves 1157 may be formed opposite to each other in lower portions of inclined surfaces 1156 of first and third sidewalls 1151 and 1153 that face each other and may be separated a predetermined distance away from one another. Both ends of lamps 130 may be inserted into through-grooves 1157 that face each other.

Predetermined spaces, for example, sidewall grooves 1159, may be formed in bottom surfaces of sidewalls 1151 through 1154. Sockets 1182 are accommodated in sidewall grooves 1159 of sidewalls 1151 and 1153 and thus are not exposed to the outside. Lamps 130 inserted into sockets 1182 penetrate through-grooves 1157. Hence, dark areas of both ends of lamps 130 are blocked by inclined surfaces 1156 and thus cannot be seen. Sidewall grooves 1159 may be formed in a pair of sidewalls having through-grooves 1157 and facing each other, for example, in first and third sidewalls 1151 and 1153. However, for convenience of manufacturing bottom chassis 1150, sidewall grooves 1159 may be formed in all sidewalls, i.e., sidewalls 1151 through 1154.

Sidewalls 1151 through 1154 described above may be manufactured by extruding metal materials, for example, stainless steel (SUS materials), and may be screwed to plate 1181. An example in the present embodiment has been described where four sidewalls are assembled into a bottom chassis, however the present invention is not limited thereto. The bottom chassis may be divided into at least two parts and assembled accordingly.

Referring back to FIGS. 13 through 15, middle chassis 1160 may be coupled to sidewalls 1151 through 1154 of bottom chassis 1150 described above. Middle chassis 1160 may include, for example, a plurality of sidewalls 1161 through 1164, and liquid crystal panel 110 may be accommodated and received in sidewalls 1161 through 1164 of middle chassis 1160.

Figure 19:
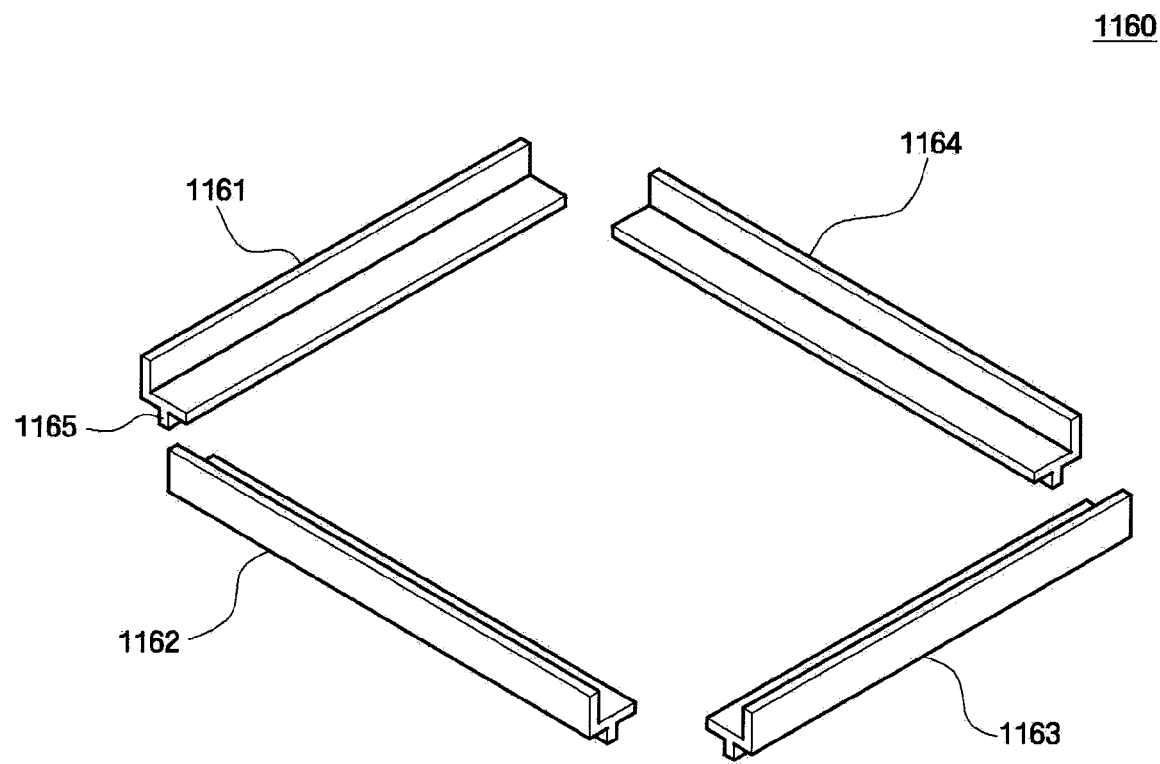
FIG. 19 is a perspective view of a middle chassis illustrated in FIG. 13.
Figure 20:
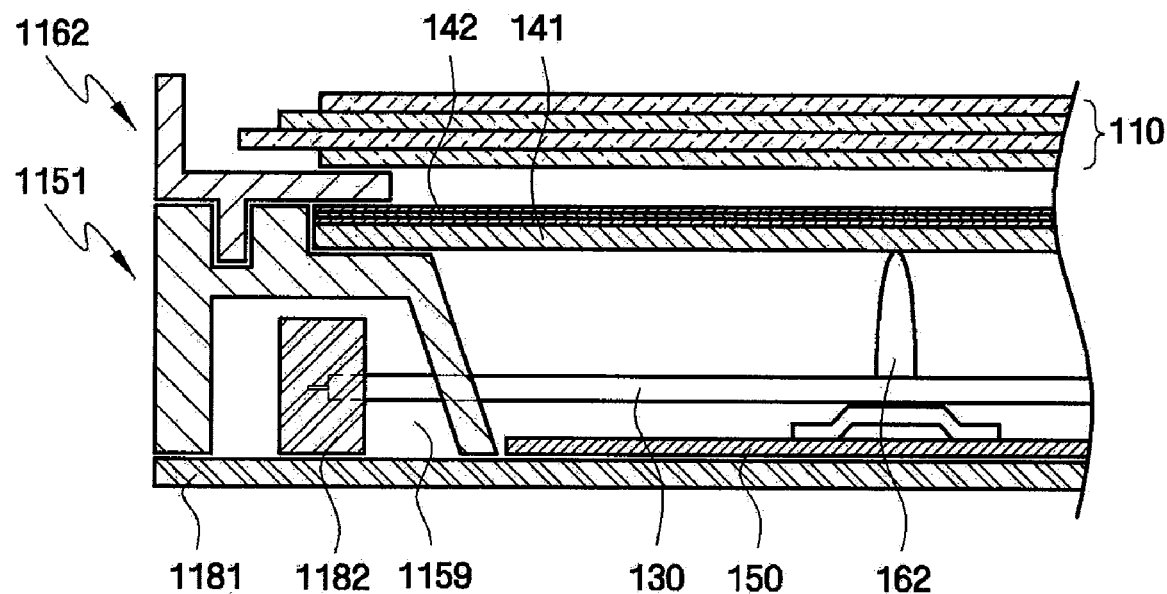
FIG. 20 is a cross-sectional view of the LCD taken along the line XIV-XIV' of FIG. 13 with the LCD partially assembled.
Figure 21:
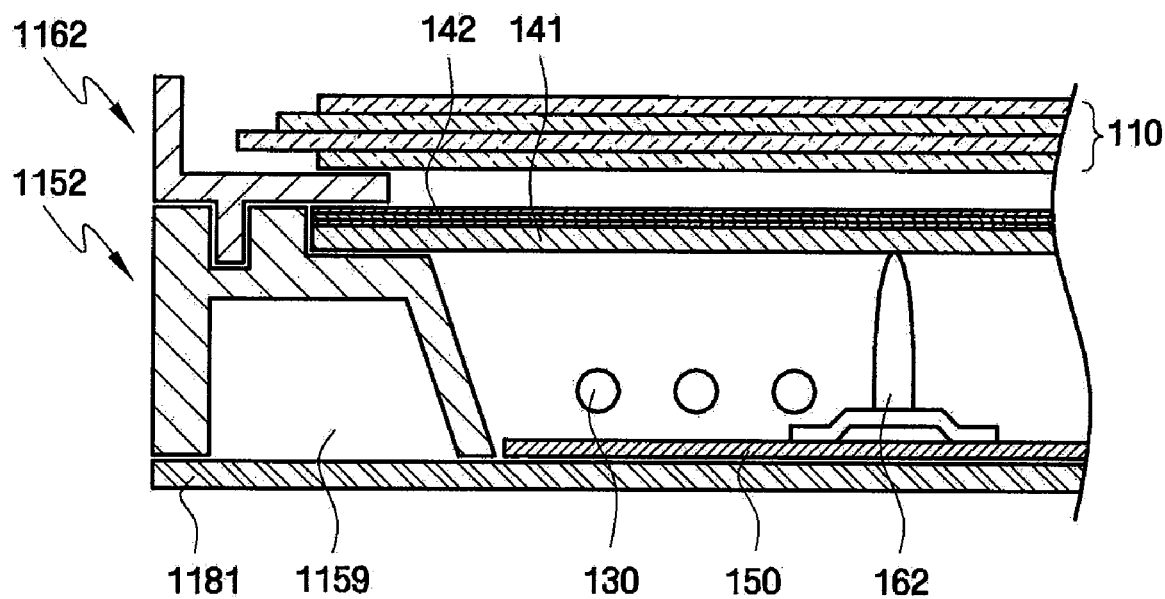
FIG. 21 is a cross-sectional view of the LCD taken along the line XV-XV' of FIG. 13 with the LCD partially assembled.

Middle chassis 1160 will now be described in more detail with reference to FIGS. 19 through 21. FIG. 19 is a perspective view of middle chassis 1160 illustrated in FIG. 13. FIG. 20 is a cross-sectional view of LCD 1100 taken along the line XIV-XIV' of FIG. 13 with LCD 1100 partially assembled. FIG. 21 is a cross-sectional view of LCD 1100 taken along the line XV-XV' of FIG. 13 with LCD 1100 partially assembled.

Referring to FIGS. 13 and 19 through 21, middle chassis 1160 may include sidewalls 1161 through 1164 coupled to sidewalls 1151 through 1154, respectively, of bottom chassis 1150 of FIG. 16. In addition, liquid crystal panel 110 may be received on a surface of each of sidewalls 1161 through 1164.

For example, sidewalls 1161 through 1164 may each having a substantially 'L' shape including a top surface step inward of middle chassis 1160, and liquid crystal panel 110 may be received on the top surface step of each of sidewalls 1161 through 1164. In addition, sidewalls 1161 through 1164 of middle chassis 1160 may further include predetermined coupling protrusions 1165 which are formed on rear surfaces of sidewalls 1161 through 1164 in a lengthwise direction, i.e., a vertical direction of sidewalls 1161 and 1163 and a horizontal direction of sidewalls 1162 and 1164 to be respectively coupled to coupling grooves 1158 of sidewalls 1151 through 1154 of bottom chassis 1150. For example, coupling protrusions 1165 may be slidably coupled to coupling grooves 1158 in the present embodiment.

Similar to sidewalls 1151 through 1154 of the bottom chassis 1150, sidewalls 1161 through 1164 of middle chassis 1160 may be manufactured by extruding metal materials, for example, SUS materials, and may be screwed to top chassis 1170. An example in the present embodiment has been described where four sidewalls are assembled into middle chassis 1160; however the present invention is not limited thereto. Middle chassis 1160 may be divided into at least two parts and assembled accordingly.

Referring back to FIGS. 13 through 15, fixing portions 1180 coupling bottom chassis 1150 and middle chassis 1160 may respectively be disposed at junctions of bottom chassis 1150. Specifically, fixing portions 1180 are disposed at the junctions of bottom chassis 1150, i.e., at both ends of each of sidewalls 1151 through 1154 of bottom chassis 1150, and fix sidewalls 1151 through 1154 to one another. Then, fixing portions 1180 couple middle chassis 1160 to bottom chassis 1150, that is, sidewalls 1161 through 1164 of middle chassis 1160, to one another.

Also, predetermined grooves (not shown) may be formed in inner side surfaces of fixing portions 1180, and both ends of each of sidewalls 1151 through 1154 of bottom chassis 1150 and both ends of each of sidewalls 1161 through 1164 of middle chassis 1160 may be inserted and fixed into/to the predetermined grooves.

Fixing portions 1180 complete the frames of bottom chassis 1150 and the middle chassis 1160 and protect the elements of the backlight assembly. Fixing portions 1180 may be formed of resin; however the present invention is not limited thereto.

Top chassis 1170 may cover and be coupled to middle chassis 1160 and bottom chassis 1150 in a direction from a front surface of liquid crystal panel 110. Top chassis 1170 may include a plurality of sidewalls 1171 through 1174. Sidewalls 1171 through 1174 may be coupled to the outer side surfaces of sidewalls 1161 through 1164 of middle chassis 1160 and/or sidewalls 1151 through 1154 of the bottom chassis 1150 to complete the frame of LCD 1100.

Figure 22:
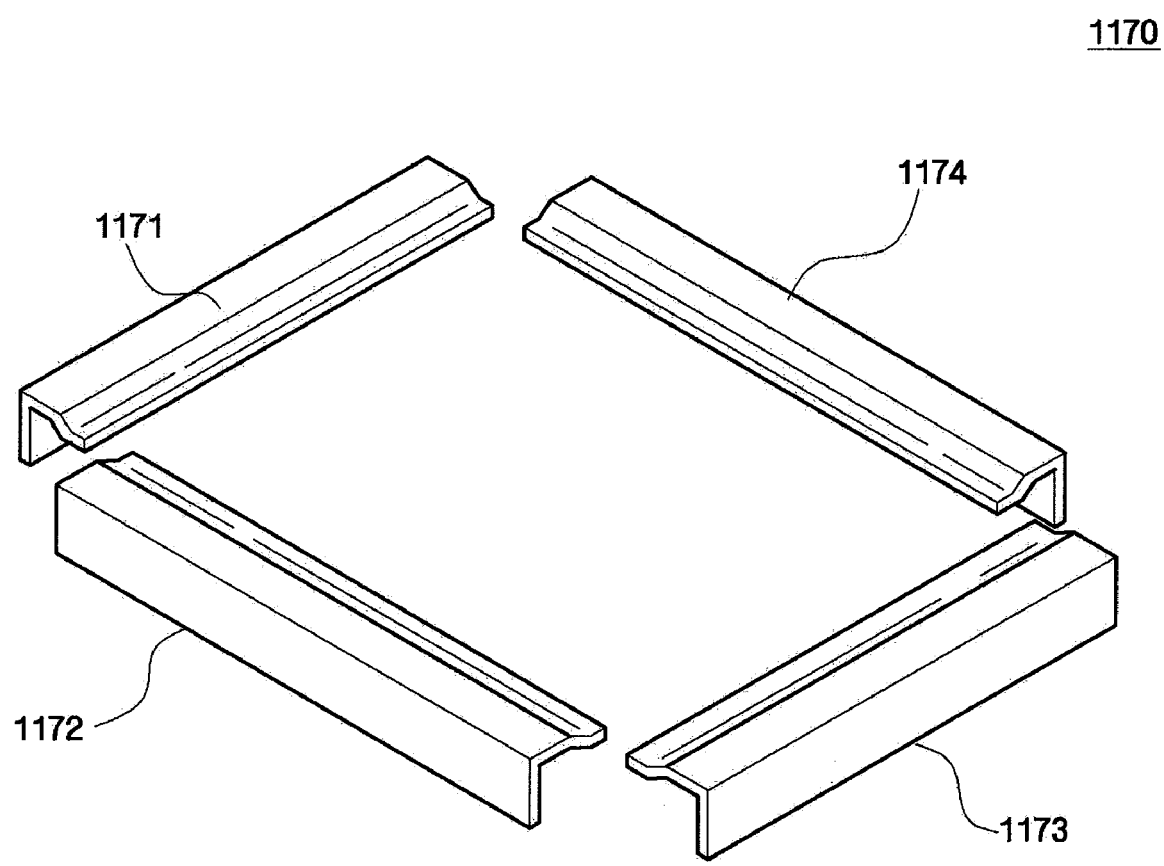
FIG. 22 is a perspective view of a top chassis illustrated in FIG. 13.

Top chassis 1170 will now be described in more detail with reference to FIG. 22. FIG. 22 is a perspective view of top chassis 1170 illustrated in FIG. 13.

Referring to FIGS. 13 and 15 through 22, top chassis 1170 may include sidewalls 1171 through 1174 which respectively cover and are coupled to outer sides of middle chassis 1160 and/or bottom chassis 1150 in the direction from the front surface of liquid crystal panel 110. Specifically, top chassis 1170 may include first through fourth sidewalls 1171 through 1174, each bent in a '⊐'bracket shape. Sidewalls 1171 through 1174 of top chassis 1170 may be coupled to the outer side surfaces of sidewalls 1161 through 1164 of middle chassis 1160 illustrated in FIG. 19 and/or the outer side surfaces of sidewalls 1151 through 1154 of bottom chassis 1150 illustrated in FIG. 16. The sidewalls may also accommodate liquid crystal panel 110 and the backlight assembly inside thereof.

Similar to middle chassis 1160 and bottom chassis 1150 described above, sidewalls 1171 through 1174 of top chassis 1170 may be manufactured by extruding metal materials, such as SUS materials, and may be screwed to sidewalls 1161 through 1164 of middle chassis 1160 and/or the outer side surfaces of sidewalls 1151 through 1154 of bottom chassis 1150. An example in the present embodiment has been described where four sidewalls are assembled into top chassis 1170; however the present invention is not limited thereto. Top chassis 1170 may have an integrated structure or may be divided into at least two parts and assembled accordingly.

In LCD 1100, according to the fourth embodiment of the present invention, a plurality of sidewalls are separately manufactured and assembled into receiving containers, such as top chassis 1170, middle chassis 1161, and bottom chassis 1150. Therefore, the structure of LCD 1100 can be simplified. Since the receiving containers can be easily manufactured through an extruding process, high molding costs can be reduced.

As described above, an LCD, a liquid crystal panel, and a hollow mold for receiving a diffuser plate according to the present invention provide at least one of the following advantages.

First, since a hollow mold having two receiving spaces for receiving both a liquid crystal panel and a diffuser plate is used, the number of parts can be reduced, which, in turn, reduces material costs.

Second, a reflective sheet shaped like a flat sheet is used and is fixed by inclined surfaces of the hollow mold for receiving a liquid crystal panel and a diffuser plate. Therefore, the shape of the reflective sheet can be simplified, and a method of fixing the reflective sheet can be automated.

Third, a gap between the liquid crystal panel and the diffuser plate is removed or reduced, thereby providing a thinner LCD.

Fourth, since a bottom chassis, a middle chassis, and a top chassis are manufactured using an extruding process, high molding costs can be reduced, which, in turn, reduces the manufacturing costs.

Fifth, parts can be shared and integrated by simplifying the structure of the LCD.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation.

Embodiments described above illustrate but do not limit the invention. It should also be understood that numerous modifications and variations are possible in accordance with the principles of the present invention. Accordingly, the scope of the invention is defined only by the following claims.

We claim:

1. A hollow mold for receiving a liquid crystal panel and a diffuser plate, the hollow mold comprising:
   an outer side surface;
   a top surface;
   an inner side surface comprising a first step which is formed in a stepped shape to define an upper receiving space, a second step which is integrally formed with the first step to define a lower receiving space, and at least a pair of inclined surfaces facing each other which slope downward from the second step; and
   a bottom surface,
   wherein the second step protrudes further inward of the hollow mold than the first step.

2. The hollow mold of claim 1, wherein the inclined surface is formed of a light reflecting material.

3. The hollow mold of claim 2, wherein the inclined surface further comprises a fixing portion parallel to the bottom surface.

4. The hollow mold of claim 1, wherein each of a pair of inclined surfaces of the inclined surfaces facing each other comprises a plurality of through-grooves in a lower portion thereof.

5. The hollow mold of claim 4, wherein the bottom surface comprises a concavo-convex surface having two concave portions.

6. The hollow mold of claim 1, further comprising a plurality of coupling grooves in the outer side surface.

7. A liquid crystal display (LCD) comprising:
a liquid crystal panel;
a diffuser plate;
a hollow mold adapted to receive the liquid crystal panel disposed in an upper receiving space and the diffuser plate disposed in a lower receiving space, the hollow mold comprising an outer side surface, a top surface, an inner side surface comprising a first step which is formed in a stepped shape to define the upper receiving space, a second step which is integrally formed with the first step to define the lower receiving space, and at least two a pair of inclined surfaces facing each other which slope downward from the second step, and a bottom surface;
a support disposed under the diffuser plate;
a reflective flat sheet for reflecting light disposed under the support; and
a bottom chassis coupled to the hollow mold and holding the hollow mold, the support and the reflective sheet,
wherein the second step protrudes further inward of the hollow mold than the first step.

8. The LCD of claim 7, wherein the inclined surface fixes the reflective sheet.

9. The LCD of claim 8, wherein the inclined surface further comprises a fixing portion formed parallel to the bottom surface and adapted to fix the reflective sheet.

10. The LCD of claim 9, wherein the inclined surface is formed of a light reflecting material.

11. The LCD of claim 10, wherein a center part of the reflective sheet is fixed by the support.

12. The LCD of claim 7, wherein each of a pair of inclined surfaces of the inclined surfaces facing each other comprises a plurality of through-grooves in a lower portion thereof.

13. The LCD of claim 12, wherein the bottom surface comprises a concavo-convex surface having two concave portions.

14. The LCD of claim 7, further comprising a plurality of coupling grooves in the outer side surface.

15. The LCD of claim 14, wherein the bottom chassis further comprises a plurality of coupling protrusions coupled to the coupling grooves.

16. The LCD of claim 11, further comprising an optical sheet disposed on the diffuser plate and directly contacting the liquid crystal panel.

17. The LCD of claim 11, further comprising an optical sheet disposed on the diffuser plate and adhered to the liquid crystal panel using an adhesive layer.

18. The LCD of claim 11, further comprising an optical sheet disposed on the diffuser plate and a spacer disposed on the optical sheet to separate the optical sheet from the liquid crystal panel.

* * * * *